(12) United States Patent
Kamenz et al.

(10) Patent No.: US 10,114,822 B2
(45) Date of Patent: Oct. 30, 2018

(54) ENHANCED REPORTING SYSTEM

(71) Applicants: Torsten Kamenz, Wiesloch (DE); Andreas Kemmler, Boennigheim (DE)

(72) Inventors: Torsten Kamenz, Wiesloch (DE); Andreas Kemmler, Boennigheim (DE)

(73) Assignee: SAP SE, Walldorf (DE)

( * ) Notice: Subject to any disclaimer, the term of this patent is extended or adjusted under 35 U.S.C. 154(b) by 1228 days.

(21) Appl. No.: 13/955,772

(22) Filed: Jul. 31, 2013

(65) Prior Publication Data

US 2015/0039638 A1    Feb. 5, 2015

(51) Int. Cl.
*G06F 17/30* (2006.01)
*G06Q 10/00* (2012.01)

(52) U.S. Cl.
CPC ....... *G06F 17/30011* (2013.01); *G06Q 10/00* (2013.01)

(58) Field of Classification Search
None
See application file for complete search history.

(56) References Cited

U.S. PATENT DOCUMENTS

| | | | | |
|---|---|---|---|---|
| 6,977,744 | B2 * | 12/2005 | Taranath | G06F 17/217 358/1.15 |
| 8,935,799 | B1 * | 1/2015 | Anderson | G06F 21/6218 726/19 |
| 2006/0288033 | A1 * | 12/2006 | Raz | G06F 17/30516 |
| 2007/0174330 | A1 * | 7/2007 | Fox | G06Q 10/10 |
| 2007/0239797 | A1 * | 10/2007 | Cattell | G06F 17/30306 |
| 2009/0222760 | A1 * | 9/2009 | Halverson | G06F 17/245 715/781 |
| 2010/0153831 | A1 * | 6/2010 | Beaton | G06Q 30/02 715/201 |
| 2011/0072007 | A1 | 3/2011 | Le Pennec et al. | |
| 2011/0302025 | A1 * | 12/2011 | Hsiao | G06Q 30/02 705/14.42 |
| 2012/0166620 | A1 | 6/2012 | Said et al. | |
| 2012/0239609 | A1 | 9/2012 | Zhao et al. | |
| 2013/0036115 | A1 | 2/2013 | Schwarz et al. | |
| 2014/0164364 | A1 * | 6/2014 | Cosgrove | G06F 17/3053 707/723 |

OTHER PUBLICATIONS

"European Application Serial No. 14171208.3, Office Action dated Jun. 17, 2015", 10 pgs.

* cited by examiner

*Primary Examiner* — Alicia M Willoughby

(74) *Attorney, Agent, or Firm* — Schwegman Lundberg & Woessner, P.A.

(57) ABSTRACT

A computer system includes a first database system that includes a plurality of tables, and a second database system that includes a subset of the tables in the first database system. The system identifies a plurality of reports that are currently generated using the second database system. The system also identifies a plurality of reports that are not currently generated using the second database system, but that are capable of being generated using the second database system, and displays a list of these reports on a computer display device. In an embodiment, the system further replicates one or more tables that are required for generation of additional reports from the first database system to the second database system.

15 Claims, 5 Drawing Sheets

ENHANCED REPORTING SYSTEM

TECHNICAL FIELD

The present disclosure relates to a reporting system on a computer system.

BACKGROUND

A business organization more than likely has a need to, and indeed does, generate a multitude of reports about its business operations relating to several topics such as human resources, finance, marketing, etc. The business organization may use different systems and/or sub-systems in generating these reports, including different processors, databases, and other computer system components. The totality of the reports generated by a business organization can be referred to as the organization's business suite applications. These business applications can define a specific set of analytical scenarios that are executed. The business applications may need to replicate tables that are required for these applications from one system to another. As the memory size and the amount of replicated data are critical resources, they might be restrictively handled. That is, the amount of data permitted to be stored on one of the systems may be limited in some way. However, based on the already replicated tables in the one system, additional analytical scenarios might be executable directly or with a small additional replication effort. The end users of such business suite applications may not know about these additional benefits that could be available with a small amount of effort and have no real opportunity to find out. Therefore, the usage of their business suite applications is not as efficient as possible.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An embodiment is a mechanism and a tool that allows a user or customer of a suite of business applications that is executed on a particular system or sub-system to calculate information about analytical scenarios that could be added with a small amount of additional effort. The system or sub-system could include as one part a traditional database system, and as a second part an in-memory database system. An example of such an in-memory database system is the HANA® in-memory system of SAP®.

An algorithm determines the tables that would be needed in this additional effort (dependent tables), retrieves the tables on the system or sub-system that are used for currently-generated reports (replicated tables), and compares both sets of tables. This comparison generates a list and recommendation for the user/customer relating to how the scenarios can be enhanced efficiently. This information is integrated in a tool and provided to the user.

In a current solution, a user/customer would need to analyze all views/reports in an in-memory database or other database system and determine the table dependencies manually. The user/customer would need to analyze the in-memory database internal information and understand the internal processing of the views (i.e., reports). However, to address these issues, an embodiment enables the user/customer to acquire this information calculated by an algorithm and provided in an end-user tool. This end user tool can be integrated into standard administration tools.

In an embodiment, an in-memory database is used to execute the business suite applications and to generate reports from those business suite applications. A traditional server database is normally part of such a system, and includes a server-based database. The server-based database normally includes the complete database of the system, and the in-memory database includes the tables that are needed to generate the reports of the business suite applications. The tables are loaded into the in-memory database by transferring the tables from the server-based database to the in-memory database.

An in-memory database allows an integration of transactional (online transactional processing (OLTP)) and analytical (online analytical processing (OLAP)) processes in one database platform. The in-memory database makes it possible to run applications, especially analytical applications, directly on the in-memory database without the need for an application server. Such an in-memory database can consist of several parts. First of all, there is the in-memory database itself, which is an in-memory database with column and row store capabilities. The database allows high-performance processing and analysis of data already on the database and therefore prevents the necessity of transferring data from the database to an application server. With in-memory technology, it is possible to push performance-critical parts of the business logic down to the database.

In an embodiment, the in-memory database can include an administration and development tool. Additional parts include tools for the integration of data from other databases, especially from databases running a business suite system. Such a tool can be delivered to a user/customer as an appliance, that is, a combination of specific hardware and software. The in-memory database allows the implementation of analytical scenarios on top of the database schema of the business suite applications that originated from a transactional scope. With this approach, it is possible to add additional functionality without changing the existing data structure and processes.

A business suite application system landscape can be used in at least two different deployment options. First, the in-memory database can be used as the primary database of the business suite system thereby replacing any other standard database product. This scenario enables direct analytical access to the data stored in the business suite system via analytical tools. As this deployment option needs the installation of the in-memory database in the business suite system, it is mainly useful if the in-memory system is installed initially or if the in-memory system is changed in some manner (e.g., due to a system upgrade).

If the business suite system is to be kept stable, but the opportunities of the in-memory database also shall be used as well, a second deployment option is available. In this option, the in-memory database is installed as a secondary database side-by-side to the existing business suite system. The data of the business suite system that are needed for the analytical applications are replicated in real-time to the in-memory database. Consequently, they are always in synch with the original system. The analytical applications are then executed on the in-memory database and the existing business suite system is not influenced or changed. This disclosure focuses on the side-by-side scenario and proposes a mechanism to enable an effective usage of the scenario in an existing user/customer landscape. While the present disclosure focuses on an in-memory database and analytical scenarios implemented on an in-memory database platform, in general, the disclosed embodiments would work in connection with any other relational databases.

The analytic tools that are to be used in connection with the in-memory database provide easily generated analytical reports and applications for business suite data. The analytical data model supporting these scenarios is implemented in in-memory database views. The new analytical data model need not change an existing business suite data model, and it need not change any business suite data. Consequently, it is optional and completely non-disruptive. To benefit from the new data model, data don't need to be extracted and there is no additional persistence needed. The data model is based on the original (existing) data.

The data model is easily understandable and can be accessed via standard access protocols like MDX and SQL. Users/customers can easily extend the data model for their own specific purposes. The data model will therefore be the enabler for an openness and flexibility in the analytic world. Every analytic tool that is able to connect via SQL or MDX (like MS Excel®, Crystal Reports®, or Business Object Explorer®) can be used to directly access the data model for analytics and reporting on operational data.

Figure 1:
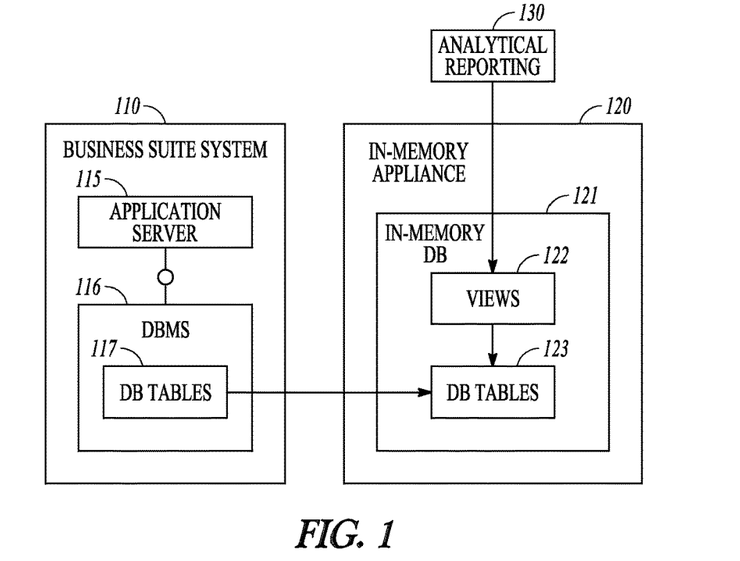
FIG. 1 is a block diagram of an example embodiment of a business suite application reporting system.

FIG. 1 illustrates the side-by-side embodiment that was mentioned above. A business suite system 110 includes an application server 115 and a database management system 116. The database management system 116 includes database tables 117. The database tables 117 are replicated from the existing business application system 110 into an in-memory tool 120. The in-memory tool 120 includes an in-memory database 121, database tables 123 (which were replicated onto the in-memory system from the business suite database tables 117), and views or reports 122. An analytical reporting tool 130 provides a user/customer with a means to query the reports/views 122.

In the side-by-side embodiment, the user/customer uses the analytical data model and the reports associated with this model on top of an in-memory database that is installed separately on an existing application system. The data that are needed for the analytical model are replicated to the in-memory database 123 on a table per table basis. Each replicated table consumes memory of the in-memory database 121, which is a critical and potentially expensive resource. Also, the table replication itself causes some load on the connected backend system 110 and the replication tool. Therefore, users/customers don't replicate all tables of an application system 110. Rather, the users/customers focus on the tables that are relevant for their specific analytical scenarios, i.e., the reports that they want to run and consequently the views that support the reports. There is consequently a clear connection between the reports that are used and the underlying views and the tables that are needed for these reports/views.

Based on the tables that are available in the in-memory database, a specific set of views and reports are executable. Typically, a user/customer first defines a set of reports to be used, then identifies the needed tables, and then finally replicates the needed tables. If a user/customer subsequently would like to add additional reports, the user/customer must check which tables are needed for the new reports, and then determine if they are already available in the in-memory database. If they are not already available in the in-memory database, these tables need to be added to the list of replicated tables, which results in additional needs for storage and execution resources. These additional needs might be compared to the benefits of the new report, and a decision might be made if the additional reports shall be set up at all.

On the other hand, the tables that are available might already support several additional reports that the user/customer doesn't use currently, or it might be possible to enable additional reports via adding a small number of tables to the replication. However, if the user/customer cannot easily access this information, and/or the user/customer is not supported in analyzing these further opportunities, the user/customer might never find out about additional capabilities that could be added with no or only small effort. This means that a user's/customer's investment in an in-memory database and its associated processes is not used as efficiently as possible. An embodiment closes this gap and enables the user/customer to analyze the report/database schema and to make the most efficient use of the current report/database schema.

An embodiment that closes the gap between a current situation in a user/customer system landscape and the possible extensions of the analytical reporting is based on analyzing the dependencies between the analytical views and their needed tables, and to comparing this to the currently available tables 123 in the in-memory database system 120. This comparison can determine the additional reporting that can be executed based on the current list of tables 123, and can further determine the additional reporting that can be executed with only small changes to the current table list. The following portion of the disclosure first discloses an algorithm to calculate the relevant information, and then secondly discloses a tool to display and use the information.

An algorithm for the analysis determines a first list of tables that are needed, on a per report or per view basis, to generate reports that could be available to a user but that are not currently being used by the user. The algorithm then compares this first list of tables to a second list of tables that are currently being used by the user to generate the current reports for the user. This comparison generates an outcome that is a list of reports or views that could be executed using only the currently available tables. That is, with no additional effort in the replication of databases. This information is of interest to the user/customer and can be provided via the tool disclosed below. In addition, the algorithm can calculate for each view how many and which additional tables (from the database tables 117) are needed for the reports or views that cannot be executed in the current situation. For each of the tables, the algorithm can also retrieve information about the table size from the relevant source system 110. All the information is then handed over to the tool that provides the information to the user/customer and makes proposals regarding the reports or views that can be added with little effort and little additional cost.

Figure 2:
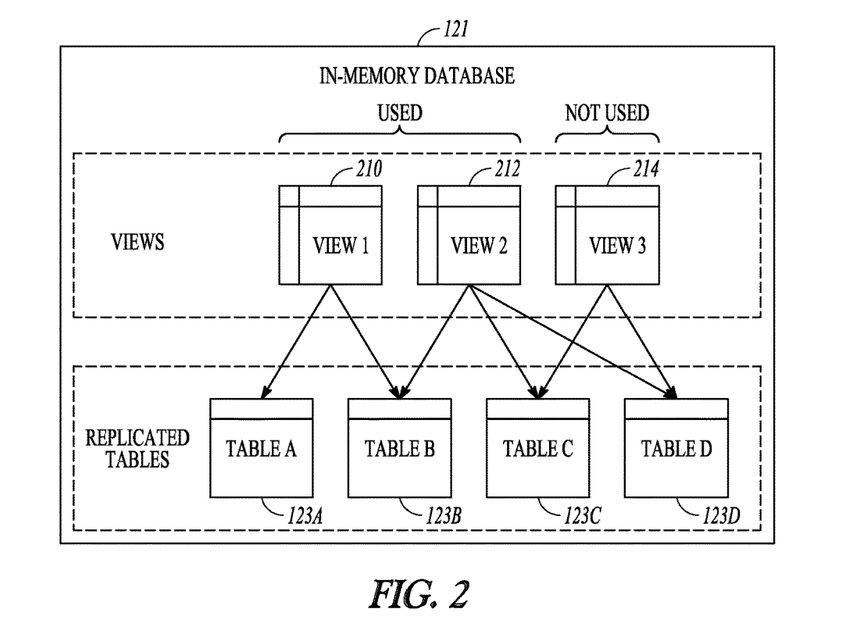
FIG. 2 is a block diagram illustrating a number of reports and the tables needed to generate those reports.

FIG. 2 illustrates an example of the relationship between views/reports and database tables in an in-memory database. In general, as noted, a list of all views (reports) and relevant tables is created, and a list of all views that are currently not used by a user/customer (but that could be used based on the available tables (123)) is created. For example, referring to FIG. 2, View 1 (210) is used by the user/customer and requires tables A (123A) and B (123B) for its generation. Similarly, View 2 (212) is used by the user/customer and requires tables B (123B), C (123C), and D (123D) for its generation. View 3 is not currently being used by the user/customer, but since it only requires tables C and D for its generation, which are already available via the replication of tables C and D, view 3 could be generated without the need of further tables. Consequently, the tool can recommend to the user/customer that the user/customer consider using view 3 in addition to views 1 and 2.

Figure 3:
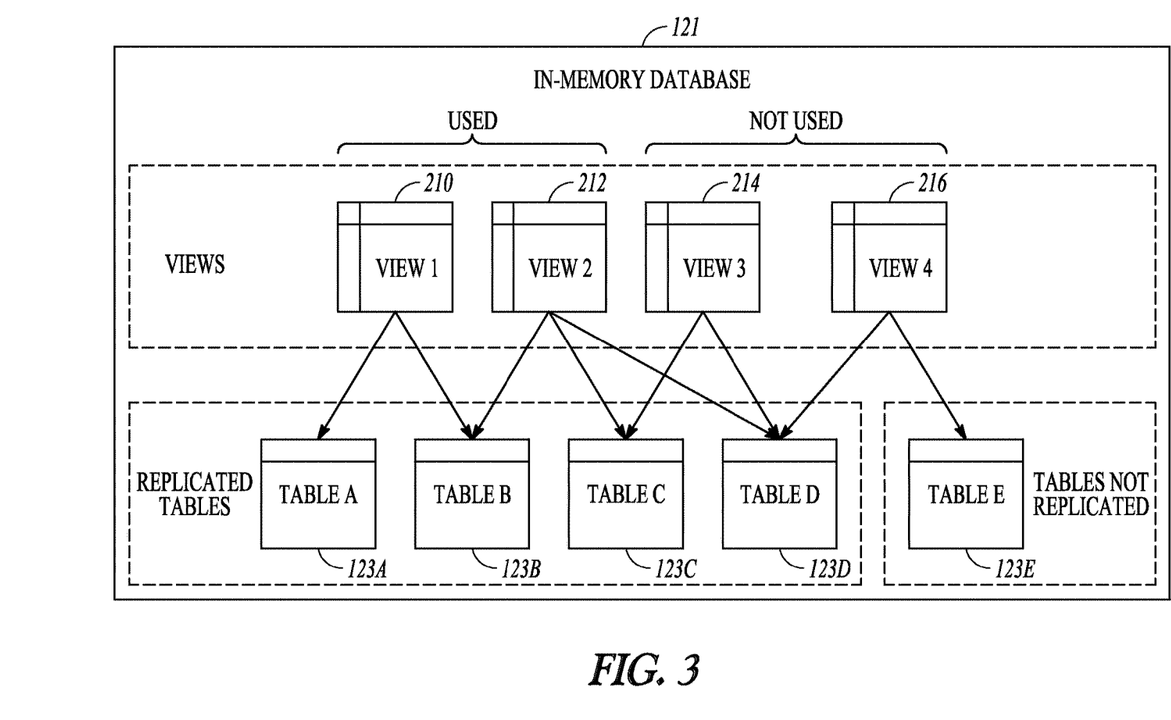
FIG. 3 is a block diagram illustrating a number of reports and the tables needed to generate those reports.

In another embodiment, the tool creates a list of tables that are needed, for each view that is not currently used by a user/customer, in addition to the tables that are already in the in-memory database 121, and calculates the size of the needed additional tables. For example, referring to FIG. 3, view 4 (216) is not currently used and requires tables D (123D) and E (123E) for its generation. As illustrated in FIG. 3, table E is not currently one of the replicated tables that are in the in-memory database 121. Consequently, view 4 cannot currently be generated. The tool reports this information to the user/customer, and additionally reports the size of table E. The user/customer can then use this information to decide whether the effort and cost of replicating and storing table E in the on-line database is justified by the business benefits provided by view 4.

The tool takes the information calculated by the algorithm/mechanism/process disclosed above and presents it to the user/customer. The user/customer can filter the list of reports and views for specific areas of interest such that only reports or views of interest to the user/customer are displayed. The tool displays the reports and views, and the user/customer can directly and immediately execute the reports and views. In an embodiment, the tool allows directly calling the report or view from the tool itself to test and evaluate the report or view.

Next, the tool presents the reports or views that cannot currently be executed but that need only a small number of additional tables for their execution. This list can be sorted according to the number of additional tables needed. The tool can also display the overall size of the additional tables that are needed per report or view. The size can also be used as sorting criteria because the table size is the main driver for resource consumption.

The tool allows a user/customer to select specific views or reports that upon selection are enabled, and the tool calculates the list of needed tables for these views or reports. This list can be handed over to the relevant replication process, so the tables can be added without further effort. Once the tables are available and the user starts the analysis again, the added views or reports appear in the list of executable views or reports.

Figure 4A:
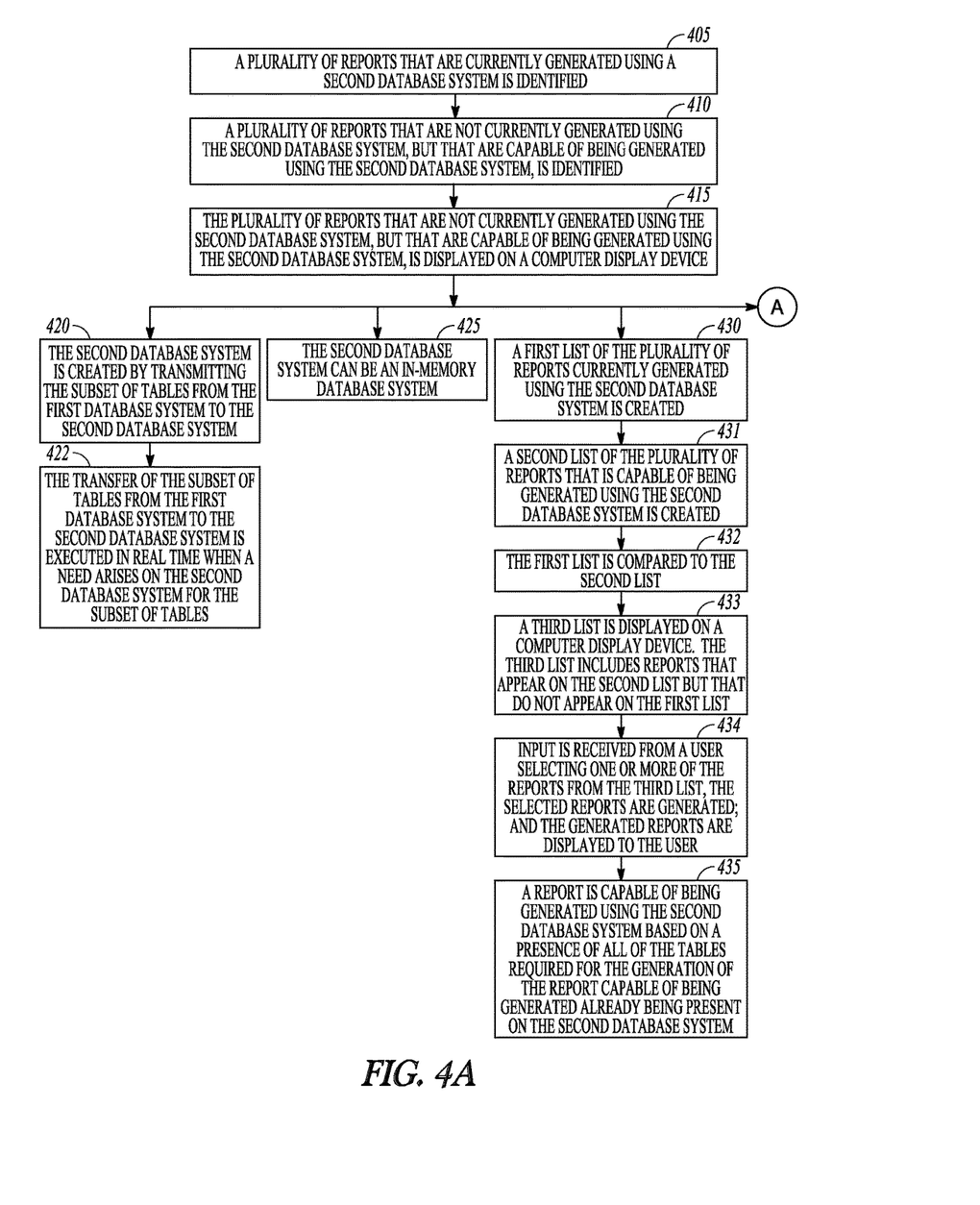
FIGS. 4A and 4B are block diagrams of a process for generating analytic reports on a computer system.
Figure 4B:
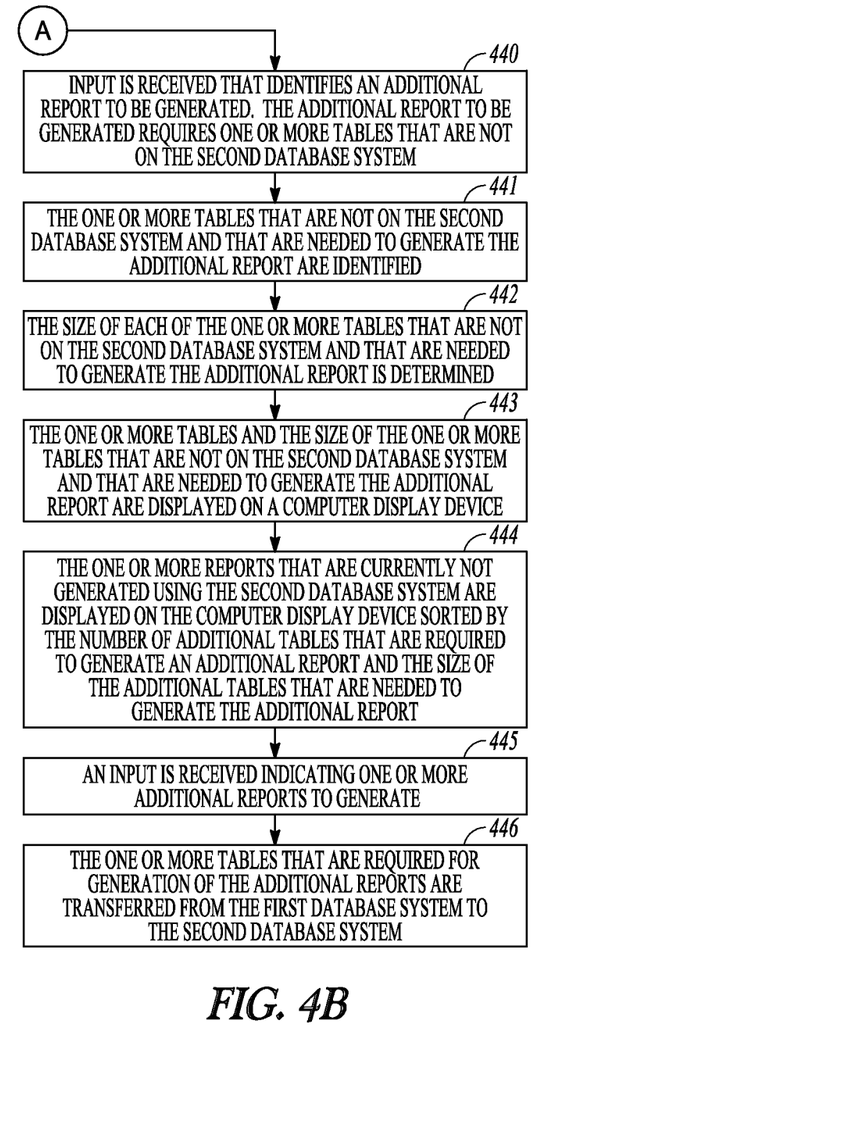

FIGS. 4A and 4B illustrate in a block diagram the above-disclosed processes and mechanisms for generating analytic reports on a computer system, and in particular, a computer system that includes an in-line memory database for the generation of the reports. FIGS. 4A and 4B include a number of process blocks 405-446. Though arranged serially in the example of FIGS. 4A and 4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 4A and 4B, at 405, a plurality of reports that are currently generated using a second database system is identified. At 410, a plurality of reports that are not currently generated using the second database system, but that are capable of being generated using the second database system, is identified. At 415, the plurality of reports that are not currently generated using the second database system, but that are capable of being generated using the second database system, is displayed on a computer display device.

At 420, the second database system is created by transmitting a subset of tables from a first database system to the second database system. At 422, the transfer of the subset of tables from the first database system to the second database system is executed in real time when a need arises on the second database system for the subset of tables.

It is noted at block 425 that the second database system can be an in-memory database system. As noted above, an example of such an in-memory system in the SAP HANA® system.

Blocks 430-435 illustrate in greater detail a manner to determine the plurality of reports that are not currently generated using the second database system, but that are capable of being generated using the second database system. At 430, a first list of the plurality of reports currently generated using the second database system is created. At 431, a second list of the plurality of reports that is capable of being generated using the second database system is created. At 432, the first list is compared to the second list. At 433, a third list is displayed on a computer display device. The third list includes reports that appear on the second list but that do not appear on the first list. At 434, input is received from a user selecting one or more of the reports from the third list, the selected reports are generated; and the generated reports are displayed to the user. At 435, a report is capable of being generated using the second database system based on a presence of all of the tables required for the generation of the report capable of being generated already being present on the second database system. All of the tables are already present on the second database system because all of the tables are used for generation of one or more of the reports that are currently generated. In other words, all the tables needed for an additional report are already on the second database system because they are needed for the reports that are currently generated.

Blocks 440-446 illustrate in greater detail a manner to determine the plurality of reports that are not currently generated using the second database system, but that could be generated with a small amount of effort (such as by replicating a relatively small table from the first database system to the second database system). At 440, input is received that identifies an additional report to be generated. The additional report to be generated requires one or more tables that are not on the second database system. At 441, the one or more tables that are not on the second database system and that are needed to generate the additional report are identified. At 442, the size of each of the one or more tables that are not on the second database system and that are needed to generate the additional report is determined. At 443, the one or more tables and the size of the one or more tables that are not on the second database system and that are needed to generate the additional report are displayed on a computer display device. At 444, the one or more reports that are currently not generated using the second database system are displayed on the computer display device sorted by the number of additional tables that are required to generate an additional report and the size of the additional tables that are needed to generate the additional report. At 445, input is received indicating one or more of the additional reports to generate, and at 446, the one or more tables that are required for generation of the additional reports are transferred from the first database system to the second database system.

In summary, a disclosed embodiment enables users/customers of an in-line database (or other relational database) to make the most efficient usage of the in-memory resources in order to maximize the benefits without needed additional investments into hardware. The embodiments include an algorithm and a user tool, thereby allowing an evaluation of the maximal usage scope of the user's/customer's current system.

Figure 5:
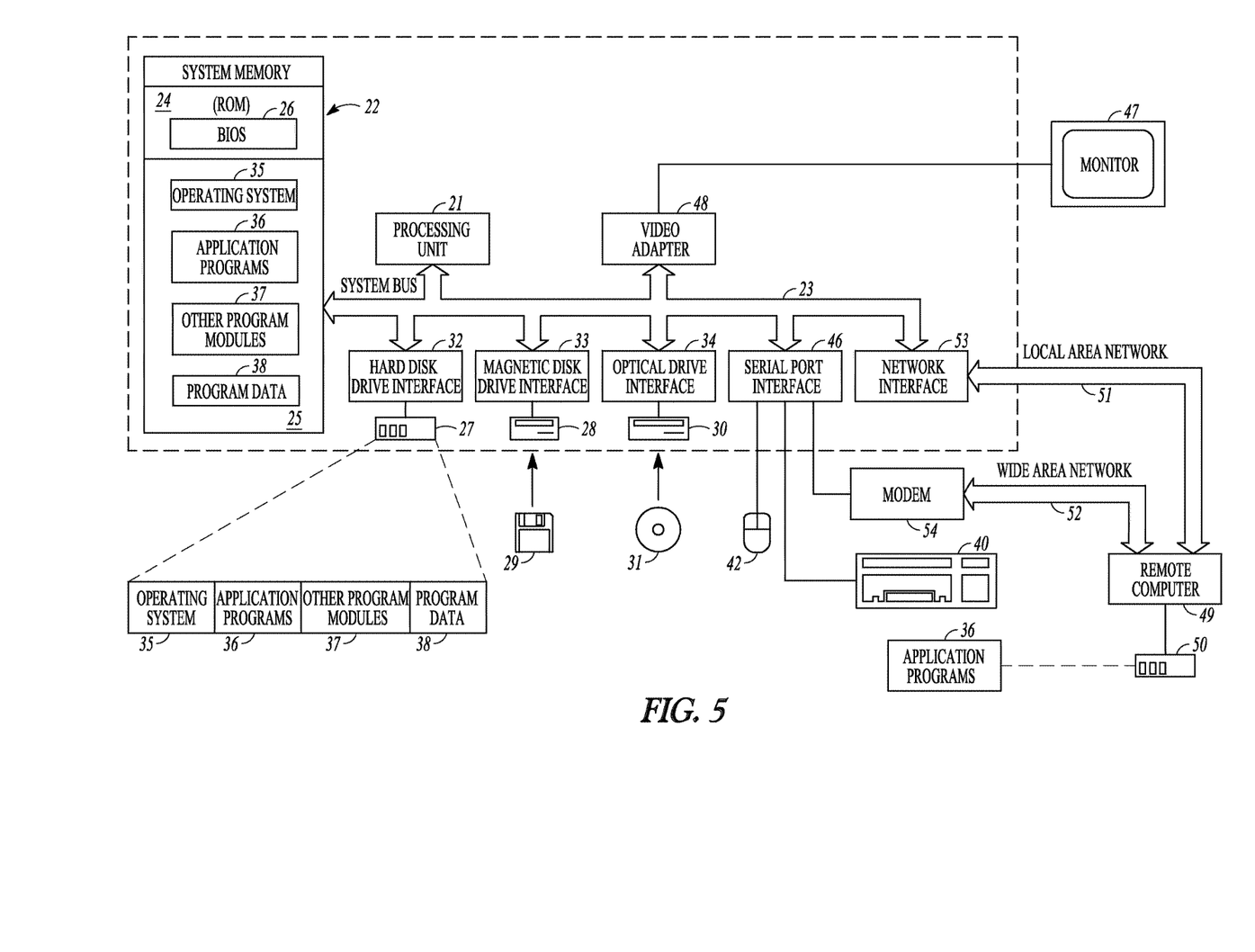
FIG. 5 is a block diagram illustrating a computer system in connection with which one or more embodiments of the present disclosure can execute.

FIG. 5 is an overview diagram of hardware and an operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. A system comprising:
a computer processor;
a first database system coupled to the computer processor, the first database system comprising a plurality of tables; and
a second database system coupled to the computer processor, the second database system comprising a subset of the tables in the first database system;
wherein the computer processor is operable to identify a plurality of reports that are currently generated using the second database system;
wherein the computer processor is operable to automatically identify without user input a plurality of reports that are not currently generated using the second database system but that are capable of being generated using the second database system;
wherein the computer processor is operable to display on a computer display device a list of the plurality of reports that are not currently generated using the second database system but that are capable of being generated using the second database system;
wherein the computer processor is operable to receive input from a user selecting one or more of the plurality of reports, generate the selected reports, and display the generated reports on a computer display device;
wherein the computer processor is operable to receive input identifying an additional report to be generated, the additional report to be generated requiring one or more tables that are not on the second database system;
wherein the computer processor is operable to identify the one or more tables that are not on the second database system and that are needed to generate the additional report;
wherein the computer processor is operable to determine the size of each of the one or more tables that are not on the second database system and that are needed to generate the additional report;
wherein the computer processor is operable to display on the computer display device a list of the one or more tables and the size of the one or more tables that are not on the second database system and that are needed to generate the additional report; and
wherein the computer processor is operable to display a list of a plurality of additional reports that are currently not generated using the second database system sorted by number of additional tables that are required to generate the additional report and size of additional tables needed to generate the additional report.

2. The system of claim 1, wherein the computer processor is operable to create the second database system by transmitting the subset of tables from the first database system to the second database system.

3. The system of claim 2, wherein the transfer of the subset of tables from the first database system to the second database system is executed in real time when a need arises on the second database system for the subset of tables.

4. The system of claim 1, wherein the second database system comprises an in-memory database system.

5. The system of claim 1, wherein the computer processor is operable to:
generate a first list of the plurality of reports currently generated using the second database system;
generate a second list of the plurality of reports that are capable of being generated using the second database system;
compare the first list to the second list; and
display on the computer display device a third list comprising reports that appear on the second list but that do not appear on the first list.

6. The system of claim 5, wherein the computer processor is operable to receive input from a user selecting one or more of the reports from the third list; generate the selected reports; and display the generated reports to the user.

7. The system of claim 5, wherein a report is capable of being generated using the second database system based on a presence of all tables required for the generation of the report capable of being generated already being present on the second database system, the all tables already being present on the second database system because the all tables are used for generation of one or more of the reports currently being generated.

8. The system of claim 1, wherein the currently generated reports and the reports capable of generation are associated with a particular user.

9. The system of claim 1, wherein the computer processor is operable to transfer one or more tables required for generation of the additional reports from the first database system to the second database system.

10. A process comprising:
identifying a plurality of reports that are currently generated using a second database system,
wherein the second database system comprises a subset of tables from a first database system comprising a plurality of tables;
identifying a plurality of reports that are not currently generated using the second database system but that are capable of being generated using the second database system;
displaying on a computer display device a list of the plurality of reports that are not currently generated using the second database system but that are capable of being generated using the second database system;
receiving input from a user selecting one or more of the plurality of reports, generating the selected reports, and displaying the generated reports on a computer display device;

receiving input identifying an additional report to be generated, the additional report to be generated requiring one or more tables that are not on the second database system;

identifying the one or more tables that are not on the second database system and that are needed to generate the additional report;

determining the size of each of the one or more tables that are not on the second database system and that are needed to generate the additional report;

displaying on the computer display device a list of the one or more tables and the size of the one or more tables that are not on the second database system and that are needed to generate the additional report; and displaying a list of a plurality of additional reports that are currently not generated using the second database system sorted by number of additional tables that are required to generate the additional report and size of additional tables needed to generate the additional report.

11. The process of claim 10, wherein the second database system comprises and in-memory database system.

12. The process of claim 10, comprising:

generating a first list of the plurality of reports currently generated using the second database system;

generating a second list of the plurality of reports that are capable of being generated using the second database system;

comparing the first list to the second list; and displaying on the computer display device a third list comprising reports that appear on the second list but that do not appear on the first list.

13. The process of claim 12, comprising:

receiving input from a user selecting one or more of the reports from the third list;

generating the selected reports; and displaying the generated reports to the user.

14. The process of claim 10, comprising:

receiving an input indicating one or more additional reports to generate; and transferring one or more tables required for generation of the additional reports from a first database system to the second database system.

15. A non-transitory computer readable medium comprising instructions that when executed by a processor execute a process comprising:

identifying a plurality of reports that are currently generated using a second database system, wherein the second database system comprises a subset of tables from a first database system comprising a plurality of tables;

identifying a plurality of reports that are not currently generated using the second database system but that are capable of being generated using the second database system;

displaying on a computer display device a list of the plurality of reports that are not currently generated using the second database system but that are capable of being generated using the second database system;

receiving input from a user selecting one or more of the plurality of reports, generating the selected reports, and displaying the generated reports on a computer display device;

receiving input identifying an additional report to be generated, the additional report to be generated requiring one or more tables that are not on the second database system;

identifying the one or more tables that are not on the second database system and that are needed to generate the additional report;

determining the size of each of the one or more tables that are not on the second database system and that are needed to generate the additional report;

displaying on the computer display device a list of the one or more tables and the size of the one or more tables that are not on the second database system and that are needed to generate the additional report; and displaying a list of a plurality of additional reports that are currently not generated using the second database system sorted by number of additional tables that are required to generate the additional report and size of additional tables needed to generate the additional report.

* * * * *